April 7, 1953  E. JANTSCH  2,634,118
HEAT EXCHANGE APPARATUS
Filed Nov. 14, 1946  3 Sheets-Sheet 1
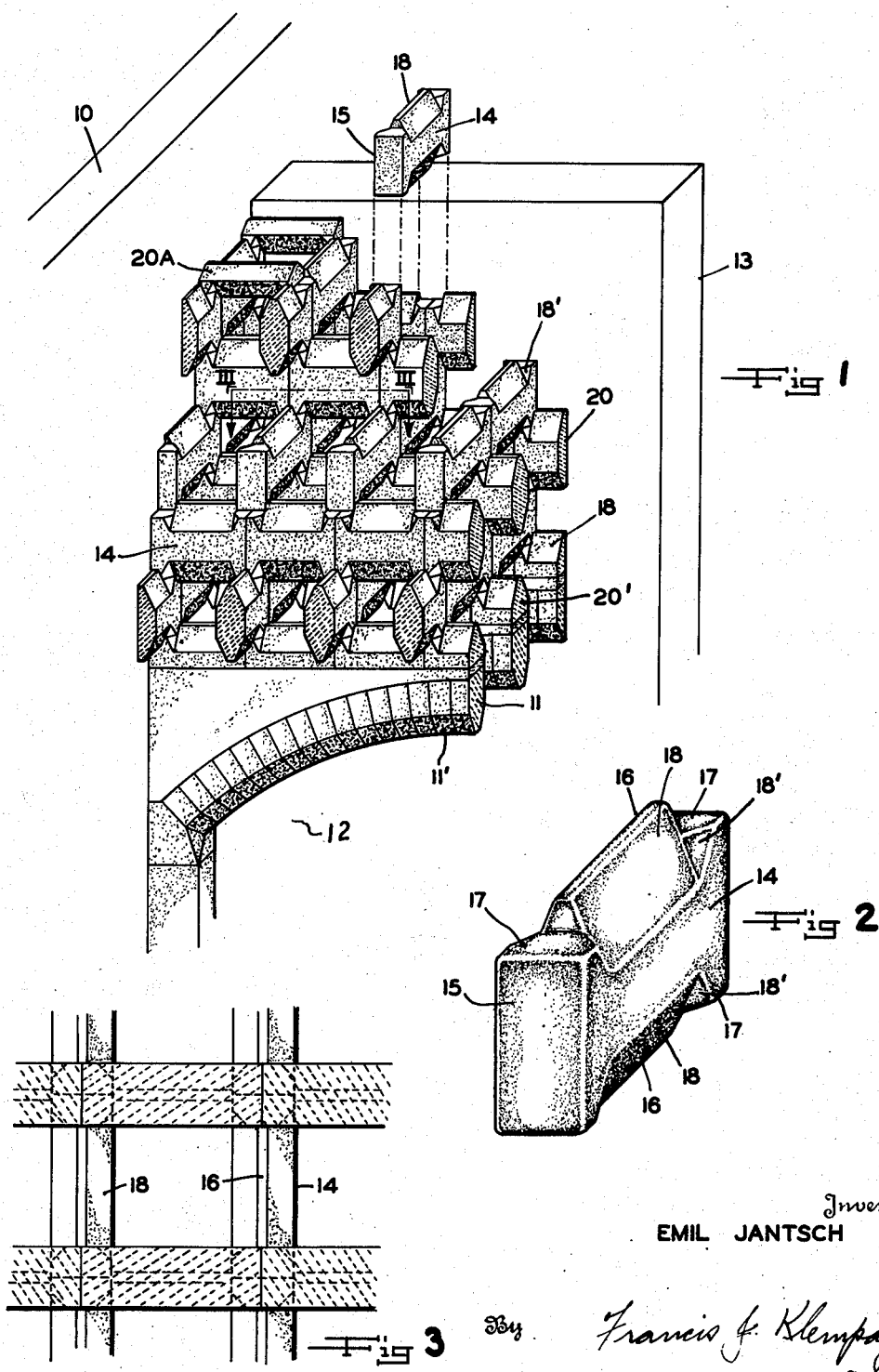
Inventor
EMIL JANTSCH
By Francis J. Klempay
Attorney April 7, 1953 E. JANTSCH 2,634,118
HEAT EXCHANGE APPARATUS
Filed Nov. 14, 1946 3 Sheets-Sheet 2
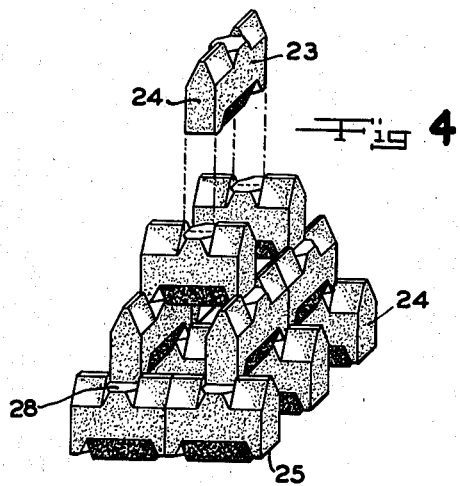
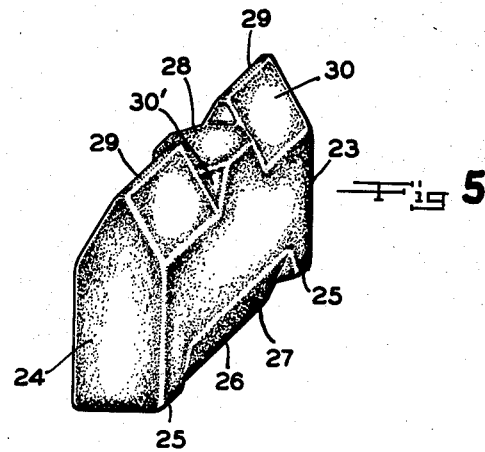
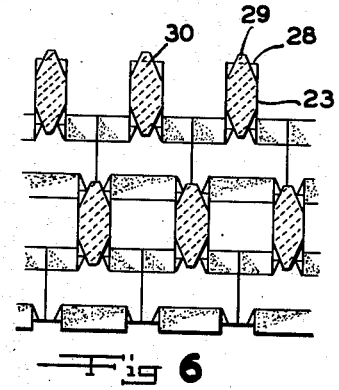
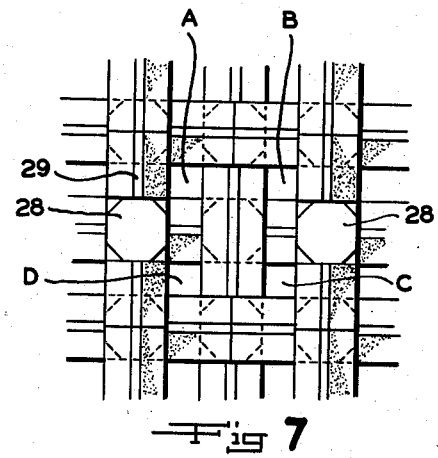
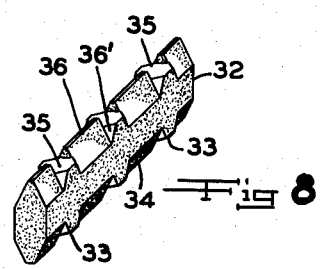
Inventor
EMIL JANTSCH
By Francis J. Klempay
Attorney

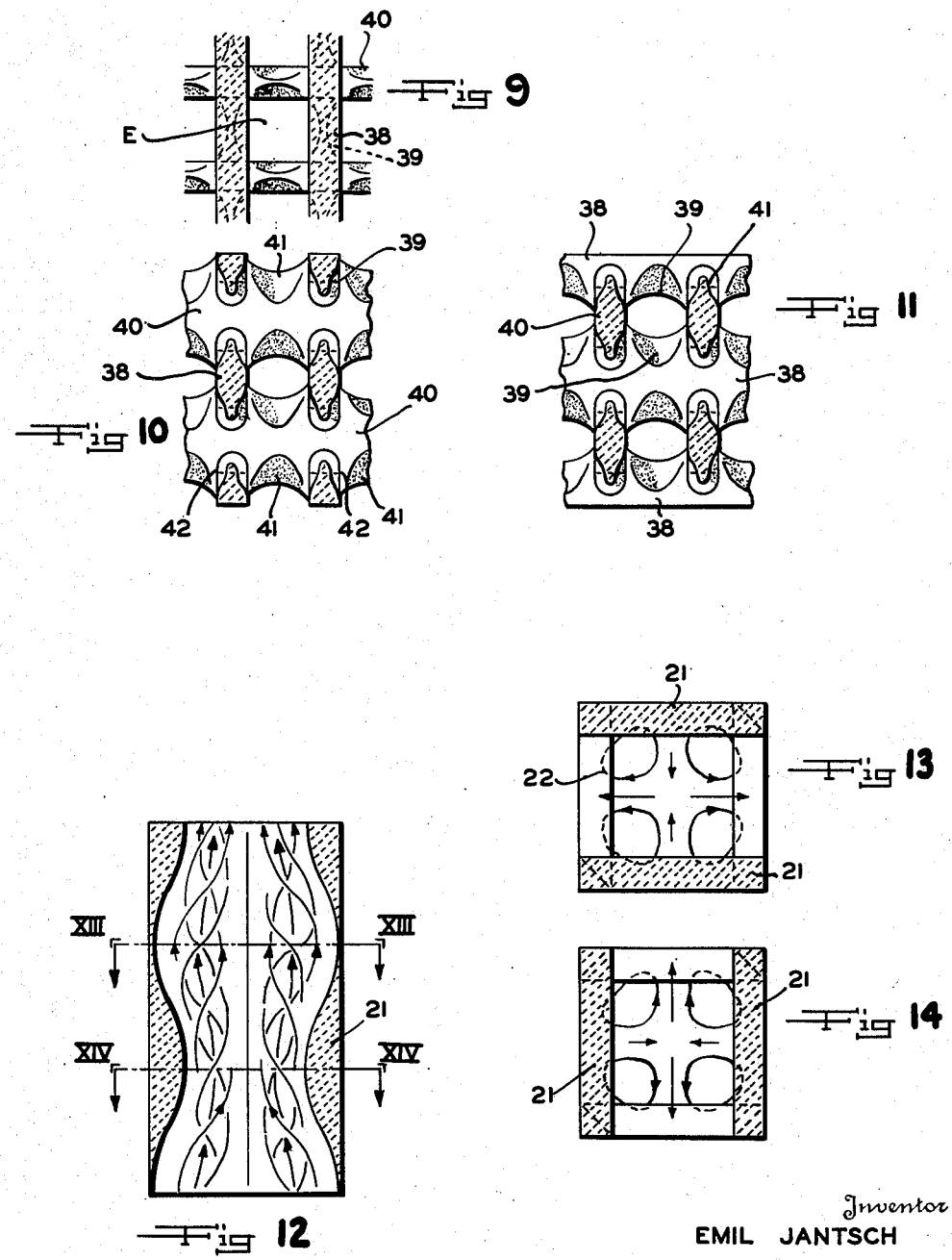

Patented Apr. 7, 1953

2,634,118

UNITED STATES PATENT OFFICE 2,634,118

HEAT EXCHANGE APPARATUS

Emil Jantsch, Youngstown, Ohio, assignor to O. F. Gayton, Youngstown, Ohio

Application November 14, 1946, Serial No. 709,719

2 Claims. (Cl. 263—51)

This invention relates to the general art of heat exchanging and more particularly to improved methods and apparatus for extracting heat from fluid quantities or, alternatively, for imparting heat to fluid masses. The utilization of fluids, either gas or liquid, for the transfer of heat for myriad purposes is an old art and is the method most commonly employed for the reason that it lends the greatest facility in the control of the physical distribution of the medium. While in some instances, as in direct firing, for example, heat values are injected directly into the fluid medium and while in some cases heat values are removed from the fluid medium through direct physical component extractment, the more normal applications involve the use of solid masses and walls to impart heat to the fluid medium by convection, conduction and radiation and to extract heat from the medium by convection, conduction and absorption.

In the case of liquid mediums the coefficient of transmission may well be such as to cause a rapid rate of heat transfer by conduction but it will be readily apparent that since gases are quite insulating the proportion of heat transfer to and from a gaseous body by conduction will be negligible. As to radiation and absorption of heat by a gaseous body, the results are of course determined by the molecular structure of the gas and by the temperature of the gas in the case of radiation and by the temperature and nature of the contiguous radiator in the case of absorption. Thus, transparent or diatomic air is quite incapable of radiating or absorbing energy, however highly heated is the air or the adjacent radiating surface, and it is only when the gas is luminous or has a certain finite opacity does radiation and absorption become appreciable. It is therefore evident that as between a gas and a solid the only reliable method of insuring a high rate of heat transfer is by convection.

It is the primary object of the invention to provide a new and improved method for transferring heat to and from a fluid medium by convection and to provide various mechanical devices inherently capable of fully exploiting the advantageous principles of my new and improved method. Heat exchange by fluid convection involves the rapid interpositioning of the separate portions of the medium with respect to the heat conducting solid so that heat will be effectively removed from the exposed surfaces of the solid or imparted thereto in a rapid manner. In accordance with the principal object of this invention, I provide an improved concept and method for rapidly effecting the interpositioning of the fluid particles and improved mechanical devices having as their inherent characteristics my new mode of operation. Further, I propose to provide various forms of such mechanical devices whereby my invention is made available for wide applicability and benefit and I also propose herein to embody such devices in practical commercial structures to be hereinafter more fully described.

Another object of the invention is the provision in heat exchanging apparatus of the general type which relies on convection between fluid and solid mediums of an improved arrangement of controlling the movement of the fluid relative to the solid whereby while a maximum rate of heat exchange may be attained there is less turbulence or other mechanical impediment to the movement of the fluid medium. This more specific object is accomplished, in accordance with the invention, through the use of one or more columnar passages for the transference of the fluid medium through the solid medium and for highest efficiency of operation this passage preferably extends along a straight axis. Further, the solid surface making up the general boundary of the passage is so constructed that it produces in the moving fluid column a kneading effect caused by simultaneous restrictions and expansions in the superimposed segments of the columnar space. The expanding and contracting surfaces of the solid are such as to produce localized eddying at circumferentially spaced points in the fluid column whereby all the particles of the fluid medium are effectively brought into contact or close proximity with the contiguous surfaces of the solid medium. Since the eddyings are localized and small the power required to effect them is negligible, and since I construct the columnar space to have the same cross-sectional area in each superimposed segment or zone compression and decompression in the fluid medium is avoided thereby further reducing the power required to move the fluid column through the heat exchanger.

While the above outlined invention is capable of wide general use it is especially applicable to regenerators as used, for example, in open hearth furnaces and blast furnace stoves; and a more specific object of the invention, therefore, is the provision of improved checker work for heat regenerators. In this equipment the gas passages are alternately used by heated products of combustion and air, and the overall efficiency of the apparatus is determined largely by the rate of convection heat transfer between the gas or air and the exposed surfaces of the regenerator elements and also by the ease with which the gas or air may be moved through the regenerator. This invention satisfies both these requirements and, further, provides checker work of the indicated desirable characteristic which is practical in design and economical to produce and assemble. A further object of the invention is the provision of improved checker work for heat regenerators which has the characteristics above outlined but which is substantially self-cleaning during its operation and which allows maximum utilization of the volume of refractory brick or tile of the regenerator structure.

The above and other objects and advantages of the invention will become apparent upon consideration of the following detailed specification and the accompanying drawing wherein there is disclosed certain preferred embodiments of the invention.

In the drawing:

Figure 1 is a perspective view, partly in section, of a regenerator structure constructed in accordance with the principles of the invention;

Figure 2 is a perspective view, on an enlarged scale, of one of the refractory bricks making up the assembly of Figure 1;

Figure 3 is a fragmentary plan view of the regenerator structure of Figure 1;

Figure 4 is a perspective view of a modified form of regenerator checker work embodying the principles of the invention;

Figure 5 is a perspective view, on an enlarged scale, of one of the refractory bricks making up the assembly of Figure 4;

Figures 6 and 7 are vertical section and plan views, respectively, of the checker work of Figure 4;

Figure 8 is a perspective view of a bar-type refractory element which may be utilized in the assembly of Figure 1;

Figures 9, 10 and 11 are plan, transverse sectional, and longitudinal sectional views, respectively, of another modified form of checker work embodying the principles of the invention; and Figures 12, 13 and 14 are vertical and horizontal sections through a theoretical structure herein utilized to explain certain of the principles of the invention.

Referring now to Figures 1, 2 and 3, reference numeral 10 designates a side wall of a checker chamber of a conventional open hearth furnace and, as usual, there is constructed in the bottom of this chamber a series of checker supporting arches 11 providing a gas or air space 12 at the bottom of the chamber. A bridge wall is shown at 13 and it will be understood that in the use of the apparatus the heated gases will be caused to flow over the wall 13 and thence downwardly through the checker work supported on the arches 11 and on into the space 12 while, upon reversal, the air or gas to be heated will be caused to flow upwardly through the checker work.

The checker work utilized in Figures 1, 2 and 3 to illustrate the invention is of the straight lattice or ventilated type and is built up of a large number of uniformly dimensioned bricks, one of which is shown more in detail in Figure 2. Referring to this latter figure, the brick is essentially a short bar having spaced parallel side walls 14 and spaced parallel end walls 15 which are normally disposed with respect to the walls 14. As indicated in Figure 2, the brick is approximately twice as high as it is wide and the top and bottom walls thereof are identical but are specially constructed to provide for a substantial center portion of the length of the brick a raised tapered rib 16 extending longitudinally of the brick. The rib 16 terminates short of the ends of the brick to provide flat end bearing surfaces 17 which have a depth approximately half of the width of the brick so that when two of the bricks are placed end to end the bearing surfaces 17 of a third brick will have firm bearing on the inner ends of the first two bricks when the third brick is supported crosswise thereon. For a purpose to be later described, the inwardly tapering or converging sides 18 of the rib 16 extend equidistantly on opposite sides of the planes which include the bearing surfaces 17. The extent of this projection is such to allow the remaining flat surface of the sides 14 to have a height approximately equal to the width of the brick whereby the slopes of the faces 18 will not be abrupt. It will be obvious, upon inspection of Figure 2, that the brick may be so constructed that the volume of the material which is outside of the planes including the bearing surfaces 17 is approximately equal to the volume of the material which is displaced from the general rectangular outline of the brick; and this presents a further advantage in the manufacture of the brick in that the clay blanks can be readily cut to size from a continuous extruded length having a cross sectional shape and area equal to the final cross sectional shape and area of the end walls of the finished brick. The forming of the rib 16 is thus made a simple pressing operation. For a purpose to be later described the inner surfaces 18' of the bricks are made sloping, as shown.

The brick of Figure 2 may be assembled in checker work as shown in Figure 1 wherein the arches 11 are approximately equal in thickness to the thickness of the brick and as a starter course a series of half bricks 20' are laid longitudinally end to end on each of the arches 11. The lower edges of arches 11 are tapered as shown at 11' and, of course, arches 11 are spaced on centers equal to the length of the bricks. I may, if desired, provide half bricks 20 for laying against the end and side walls of the checker chamber but this is a refinement which will ordinarily not be used. The said transverse rows are spaced on centers exactly equal to the length of the brick and upon this being accomplished, the first longitudinal course of brick is laid in such manner that each of the lower bearing surfaces 17 of the second course bricks overlies one-half of the composite bearing surface provided by adjacent ends of two first course bricks. In this manner I provide a checker structure which while made up of easily handled identical brick reversible end-for-end and edge-for-edge possesses such interlocking characteristics as lend extreme stability to the completed assembly. I may also provide vertically shortened top-course bricks 20A which have a lower portion identical with the lower portion of any of the standard brick and an upper edge which tapers from end to end of the brick. This special top-course brick has a low center of gravity and therefore resists overturning during cleaning operations. The exposed ends of the ribs 16 provide guiding surfaces to assist in the proper positioning of the bricks of the next higher course in building up the checker work.

The checker work above described provides a series of vertically extending column-like openings for the passage of gas or air and because of the symmetry of the brick these columnar passages have identical shape characteristics in either direction of flow of fluid therethrough. Further, since all the bricks are identical in shape and size the columns are essentially square which is an important factor as will hereinafter appear. Now it should be observed from Figure 1 that the horizontal plane passing through the bottom ends or edges of the top slopes 18 of any brick course is substantially coincident with the horizontal plane touching the bottom projected edges of the lower ribs 16 of the next higher brick course while the plane of the upper ends or edges of the lower slopes 18 of the said next higher brick course is coincident with the plane touching the top edges of the upper rib 16 of the said any brick course. Therefore it will be evident that there is no change in the effective cross-sectional area of the columnar passage since in either direction of flow as the fluid is being constricted in one lateral direction, for example, it is being expanded at exactly the same rate in another lateral direction. This is a most important consideration as I have found that periodic variations in cross-sectional area of a columnar fluid passage is the greatest impediment to the flow of fluid through the passage and, further, the resulting periodic compression and decompression, if abrupt, of the moving fluid column makes impossible the complete uniform sweeping of all the exposed surface of the surrounding solid medium. In the case of abruptly pulsating columns alternate unswept bands will appear to reduce the efficiency of the apparatus and to provide opportunity for the lodgement of debris which necessitates frequent cleaning of the apparatus.

It should be particularly observed that in each of the fluid columns in the checker structure above described the corner structure is such that simultaneously with a recession in one direction (provided by the slope 18) there is an inward advancement in a right angularly related direction (provided by the slope 18 of another brick) thereby creating a torque or twisting action which results in eddying of the corner portion of the fluid column about a vertical axis. While this eddying is not particularly severe or abrupt due to the easy slopes 18 of the bricks it is sufficient to cause an effective interchangement of the air or gas in the center part of the moving column with the air or gas in the outer peripheral portions of the moving column. In this manner complete and efficient sweeping of all the air or gas particles of the column with the exposed surfaces of the surrounding solid medium will be effected and also the effect of this centrifugal sweeping will be the reduction in the thickness of the stationary fluid film on the solid surfaces. Thus, maximum efficiency in heat transfer will result with a minimum of mechanical effort expanded in forcing the fluid column through the heat exchanging passage. This theory is illustrated in Figures 12, 13, and 14 wherein the shaded areas represented by reference numeral 21 represent the solid columnar passage forming medium of the heat exchanging system and wherein the eddyings of the gas or air of the upwardly moving fluid column is represented by the arrows 22. These figures also illustrate the undulating nature of the fluid passage while showing that this can be readily accomplished without altering the cross-sectional area of the fluid column at any point throughout its path. Thus the space intermediate the shaded areas 21 of Figure 13 is equal to the space intermediate the shaded areas 21 of Figures 14.

The above described relative positioning of the vertical extents of the slopes 18 of the brick is theoretically true for a sharply defined brick. However, all the inner and outer corners of the brick are preferably rounded or "eased" to resist breakage in handling and while this slightly reduces the extent of outward projection of the ribs 16 with respect to the bearing surfaces 17 the resultant modification in the general uniform-area characteristic of the flues or passages in the checker work is of a minor nature and is not objectionable since the deviation is one of expansion rather than of construction.

The above described checker work involving brick of practical preferred proportions results in substantially maximum utilization of the composite volume of the brick while yet providing a structure which is practical in design, quite stable structurally, and possessing certain inherent operational advantages as regards efficiency of heat transfer as explained above. For regenerative purposes optimum efficiency design dictates that the thickness of the brick or other solid heat storage medium be correlated with the coefficient of heat transmissibility of the particular material making up the brick or other solid material and with the frequency of the cyclic operation of the regenerator. A thin brick is more efficient if the reversals occur frequently and in accordance with this invention this requirement is substantially met by making the effective portions of the brick generally flatter as is apparent in Figures 1 and 2. Another important requirement in regenerator design is that there must be sufficient exposed area to face the luminosity of the incandescent heating gases to effect a rapid rate of heat transfer since it is recognized that in this portion of the cycle heat is transferred largely by radiation. In this invention this condition is effectively met by increasing a dimension of the brick in a direction which will present a larger surface to the incandescent gases without increasing the normal volume of the brick. Both these improvements are obtained, moreover, while yet retaining basic soundness in the design and practicality of the brick and while yet providing a structure which is most effective in transferring the heat stored in the brick to the moving column of air or other fluid medium by convection.

In the embodiment of the invention illustrated in Figures 4 through 7 the brick is specially constructed to allow the checker work to be laid up in double-staggered open lattice design which may be advantageous in certain installations because it multiplies by four the number of vertical columnar passages formed in the assembly. The brick is again formable very readily from a clay blank of uniform cross sectional shape and area without removing any material and without altering the length of the blank. Thus the brick has flat parallel side walls 23 and parallel end walls 24 which are the original surfaces of the blank from which the brick is formed. The lower or bottom wall of the brick of Figure 5 is formed identically with the bottom half portion of the brick of Figure 2, having flat bearing end surfaces 25 corresponding to the bearing surfaces 17 of the brick of Figure 2 and having a downwardly projecting but longitudinally extending rib 26 with sloping side walls 27 corresponding to the lower rib 16 and the sloping walls 18 of the brick of Figure 2. The center portion of the upper wall of the brick blank is left undisturbed as shown at 28 to provide a flat bearing surface to receive two of the bearing surfaces 25 of adjacent bricks in the next higher course when the latter are properly positioned crosswise therein as taught in Figure 4. The end portions of the upper wall of the brick blank are formed to provide the longitudinally extending ribs 29 having the sloping side walls 30 and as explained above in connection with the sloping walls 18 of the brick of Figure 2 the walls 30 extend equidistantly above and below the plane of the surface 28. The longitudinal dimension of the bearing surface 28 is approximately equal to the width dimension of the bearing surface 25 so that the above advantage of providing an inherent guiding arrangement to facilitate the laying up of the checker work is retained.

Bricks formed according to the showing of Figure 5 are laid up in staggered lattice pattern as shown in Figure 4 and here again the rows of the first course are supported on suitably dimensioned and spaced arches not shown. The next higher course is laid crosswise on the rows of the first course with the adjacent bearing surfaces 25 of two of the bricks in the next higher course resting solidly on each of the bearing surfaces 28 of the bricks of the first course. This process is repeated until the checker chamber is sufficiently filled and it should be apparent that, as with the brick of Figure 2, the inherent interlocking and guiding features of the brick design facilitate materially the assembling of the checker work in the checker chamber. The brick of Figure 5 also retains all the other advantages as regards durability, volume efficiency, etc., specified above for the brick first described.

The plan pattern for the checker work of Figure 4 is illustrated in Figure 7 and it will be observed that in each theoretical square columnar segment of the composite checker work volume having a side dimension equal to the length of one of the bricks there will be provided four vertical uninterrupted passages for the flow of columns of a fluid medium through the checker work. In Figure 7, I have designated these four passages as A, B, C and D; and an analysis of the structure of Figure 4 will show that each of these passages is identical and, further, that the flow manipulating characteristics of each passage is the same in either direction of fluid flow. Also the corner-making wall surfaces of the superimposed bricks have overlapping projections providing simultaneous recession and advancement in right angularly disposed directions, the same as in the embodiment of Figures 1–3, whereby localized corner eddying is effected in the moving fluid columns without change in the effective cross-sectional areas of the columns and the resulting power consuming and passage clogging reverberations which are normally serious in small passages of long length. Thus, all the features and advantages of the brick of Figure 2 are retained in the design of brick illustrated in Figure 5.

The brick of Figure 5, when laid up in the double-staggered pattern of Figure 4 or in the single-staggered pattern to be hereinafter described possesses the further definite advantage of always directing the above explained localized eddying in the same direction of rotation so that the swirling force is, in effect, accumulative thereby insuring a more pronounced and sustained spiral turbulence. Also in this construction the vertically flowing fluid column is divided by a centrally located and transversely extending brick in each alternate course thereby insuring effective intermixing of all the fluid passing through the checker work. Since the ease of cleaning and less pressure drop in the straight lattice checker work of Figure 1 makes this type probably more suitable for open hearth applications the above advantages peculiar to the staggered type of checker work make the same probably more suitable for soaking pits and reheating furnaces, for example.

Figure 8 is a perspective view of a bar-type of brick, indicated generally by reference numeral 32, which may be made of any desired length and substituted for a number of the individual brick in the assembly of Figure 1. The bar brick 32 has spaced lower bearing surfaces 33 and intermediate downwardly extending ribs 34 and an identical and aligned upper structure comprised of the bearing surfaces 35 and intermediate ribs 36. Now simply by shifting the upper formations of the bar 32 longitudinally to position the bearing surfaces 35 immediately above the centers of the ribs 34 the bar may be made suitable for substitution for two or more of the individual bricks of the double-staggered lattice structure of Figure 4. By utilizing bars of the shape of Figure 8 in alternate courses of the checker work and the modified form of bars described in the next above sentence for the intermediate courses a single-staggered type of lattice checker work may be readily produced as will be obvious and such single-staggered checker work may be desired for certain applications. The single-staggered checker work may also be produced, of course, by utilizing the individual brick of Figure 2 in alternate courses and the individual brick of Figure 5 for the intermediate courses. Referring back to Figure 5, the triangular surfaces 30' which are intermediate surfaces 23, 28 and 30 are sloped away from the surfaces 30, as shown. The same structural feature is followed for the triangular surfaces 36' of the bar of Figure 8.

Figures 9, 10 and 11 illustrate how the basic principles of my invention may be applied to an interlocking bar-type of straight lattice checker work to provide passages for the fluid columns which are more generally circular in cross-sectional shape. In this structure the longitudinal bars 38 are generally oval in cross section but at periodic intervals are concavely skived on either side of their top and bottom edge portions as shown at 39 to provide tapering constrictions in a lateral direction in each of the vertical passages, one of which is shown at E in Figure 9. The transverse bars 40 are similarly formed, having the concave skivings 41 on each side of the upper and lower edges of the bar at precisely spaced points. Intermediate the skivings 41 the bars 40 are notched transversely as shown at 42 to receive the correspondingly notched portions of the bars 38 at points intermediate the skivings 39. The depth of the notches 42 is such as to position the thinnest edge formed by the skivings 39 substantially horizontally opposite the inner end of the skivings 41 of the bars 40. Thus I again provide an improved fluid directing passage in a checker work structure which while not changing the cross-sectional area of the passage is effective in providing circumferentially spaced localized kneading or eddying in the fluid column to effect a maximum rate of heat exchange by convection. The modification of Figures 9, 10 and 11 retains substantially all the advantages discussed above in connection with the brick of Figure 2 and it should be readily apparent that the elements 38 and 40 may readily be made in individual brick-size components generally similar to the bricks of Figures 2 and 5 if this is considered necessary or desirable. The bars or bricks of Figures 9, 10 and 11 are somewhat more suitable for laying horizontal fluid passages or flues than the other embodiments herein described.

It should now be apparent that I have provided improved methods and apparatus for transferring heat by convection from a solid to a fluid medium and vice versa and improved apparatus for absorbing heat from a fluid medium by radiation and imparting the stored heat to a second fluid medium which accomplish the objects initially set out. Through the use of the substantial straight fluid passages of uniform cross-sectional area but with specially constructed circumferentially spaced arrangements for imparting gradual spiral turbulences in the outer periphery of the fluid column, I am enabled to effect a maximum rate of heat transfer while yet eliminating any necessity for increased pressure head on the fluid medium and while providing a structure which maintains its efficiency through self-cleaning due to the completeness with which all the exposed surfaces of the confining solid medium is swept by the passage of the fluid medium.

It should also be particularly noted that since the fluid medium passages or flues in any of the embodiments herein shown or suggested are generally square or round in cross-section, a minimum rate of clogging will necessarily result even though deposits of slag, carbon, or other debris build up on the inner surfaces of the passages or flues. This is so because the ratio of the cross-sectional area of a film thickness of any given magnitude to the general cross-sectional area of the passage or flue is a minimum for a square or round shape. Stated another way, the ratio of perimeter to cross-sectional area is less for a circle or a square than for an oblong shape, for example.

The efficiency of convection heat transfer in any of the embodiments herein shown or suggested results, as stated above, from the forced introduction in the moving columns of the fluid medium of the plurality of circumferentially spaced eddyings or spiral turbulences which being individually of small transverse dimension are effective to sweep all the surfaces, including the corners of the passages or flues. By sloping such transition surfaces as the surfaces 18' of the block of Figure 2, the surfaces 30' of the block of Figure 5, and the surfaces 36' of the bar of Figure 8, for example, the progression of these spiral turbulences is unimpeded as will be understood from a study of the assemblies of Figures 1 and 4. Therefore these spiral turbulences will have sufficient angular velocity and centrifugal effect to reduce materially the stationary fluid film thicknesses on the solid surfaces of the passages or flues which stationary film, being highly insulating in character, is known to present the greatest impediment to the transfer of heat by convection between a fluid and a solid.

The invention is applicable for regenerative checker work and in such use it is particularly advantageous in that the brick volume is efficiently utilized and a high rate of radiant heat absorption is maintained. On the question of volume efficiency I desire to particularly emphasize that the herein suggested brick width to height ratio is dictated solely by practical design considerations to provide elements which are stable both structurally and thermally and which may be utilized in filling the checker chambers in a speedy and efficient manner. Theoretically, the most efficient shape for a heat storing element charged principally by radiation is a spherical shell but as this forming would be wholly impractical the next best shape for regenerator purposes would be a cylinder or tube or a round bar if not of too great diameter and if the operational cyclic periods are substantial. If it were not for the fact that the resulting apparatus would require many more elements in its assembly I would prefer to make the cross-sectional form of my brick or bars generally circular (retaining, however, the sloping or tapering upper and lower edges for producing the spiral turbulences) and it should therefore be understood that the portions of the elements herein illustrated and described are a compromise of various factors.

Another advantageous characteristic of the regenerator bricks or bars herein suggested or specifically described is that there is fairly uniform skin temperature distribution which makes for a maximum rate of heat transfer as will be understood and which results in the equally important uniform expansion and contraction of the elements to reduce spalling or fracture through thermal shock of the elements. Thus the individual elements of the checker work are protected against individual rapid deterioration and failure, and the checker work as a whole will have long life because of its inherently stable and interlocking nature and because the component elements are such as to allow sufficient expansion and contraction in any direction without disturbing the large bearing area and interlocking characteristics of the structure. While I have limited the specific disclosures herein to checker work of the lattice type, it should be understood that the invention is equally applicable, as far as regenerators are concerned, to the wall or plate type and to the chimney or closed cell type as will be readily apparent. Also, while the embodiments specifically illustrated are concerned with generally square or round fluid passages or flues, it should be understood that substantially all of the principles of the invention are equally applicable to other specific shapes as triangular, hexagonal etc., and it should also be clear that the fluid passage or flue surfaces need not be kneaded right angularly in succeeding brick courses but instead the desired result may be accomplished more gradually by gradually shifting the orientation of the laterally inclined flow directing surfaces of the fluid passage or flue as desired. Insofar as the convection heat transfer aspects are involved the invention is equally applicable to further structures as formed-plate recuperators and heat exchanging tubes generally, for example. Therefore the above specifically described embodiments of the invention should be considered as representative only and not limitive of the invention and since my invention may be embodied in a wide variety of physical elements, reference should be had to the appended claims in determining the scope of the invention.

What I claim is:

1. A refractory brick for use in regenerative checker work comprising an elongated refractory block having spaced bearing portions of substantially rectangular cross section and an intermediate portion of generally hexagonal cross section, said intermediate portion having parallel flat side faces which are flush with but not as high as the side faces of the bearing portions, said intermediate portion having two faces which converge upwardly from said parallel sides to form a ridge that is higher than the top surface of the bearing portion and having two like faces which converge downwardly from the side faces to provide a similar ridge along the bottom of the brick projecting below the bottom surfaces of the bearing portions, and oblique sloping triangular transition surfaces merging into and having contact boundaries with converging side walls, parallel intermediate side faces, and top bearing surfaces arranged to create spiral turbulence in fluid flowing across the transition surfaces.

2. Brick structure for heating regenerative checker work comprising a plurality of identical elongated refractory bodies, each provided on its top and bottom edges with horizontally disposed flat bearing surfaces whereby a longitudinally extending row of such brick may be superimposed on a pair of spaced parallel transversely extending rows of brick and whereby other spaced and transversely extending rows of brick may be superimposed on said first mentioned row, each of said bodies having principal spaced side wall surfaces and being formed along its upper and lower edges at points spaced from said bearing surfaces to provide an upwardly tapering edge portion having sloping side wall surfaces extending both above and below the top bearing surfaces and to provide a downwardly tapering edge portion having sloping side wall surfaces extending both below and above the bearing surfaces, oblique sloping surfaces merging into and having contact boundaries with the bearing surfaces, sloping side walls and vertical side walls on bricks of both of said rows to provide smooth transition surfaces between assembled bricks in the structure, said side surfaces and said sloping surfaces providing fluid passage of substantially uniform cross sectional area free of abrupt contour changes in the direction of fluid flow.

EMIL JANTSCH.

REFERENCES CITED

The following references are of record in the file of this patent:

UNITED STATES PATENTS

| Number | Name | Date |
|---|---|---|
| 1,980,827 | Reed | Nov. 13, 1934 |
| 2,467,166 | Thorpe | Apr. 12, 1949 |

FOREIGN PATENTS

| Number | Country | Date |
|---|---|---|
| 745 | Great Britain | Jan. 13, 1916 |
| 11,911 | Great Britain | Aug. 18, 1916 |
| 254,505 | Great Britain | July 8, 1926 |
| 521,024 | Great Britain | May 8, 1940 |